United States Patent
Moore et al.

(10) Patent No.: US 10,417,608 B2
(45) Date of Patent: Sep. 17, 2019

(54) REAL-TIME ANALYSIS OF WELLSITE INVENTORY ACTIVITY

(71) Applicant: Halliburton Energy Services, Inc., Houston, TX (US)

(72) Inventors: James Wilson Moore, Denver, CO (US); Stephen Robert Holtz, Littleton, CO (US); Rod McMillon, Fort Collins, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 454 days.

(21) Appl. No.: 15/118,052

(22) PCT Filed: Mar. 14, 2014

(86) PCT No.: PCT/US2014/027429
§ 371 (c)(1),
(2) Date: Aug. 10, 2016

(87) PCT Pub. No.: WO2015/137963
PCT Pub. Date: Sep. 17, 2015

(65) Prior Publication Data
US 2016/0358120 A1 Dec. 8, 2016

(51) Int. Cl.
*G06Q 10/08* (2012.01)
*G06F 16/23* (2019.01)
*E21B 41/00* (2006.01)

(52) U.S. Cl.
CPC .......... *G06Q 10/087* (2013.01); *E21B 41/00* (2013.01); *G06F 16/23* (2019.01); *G06Q 10/08* (2013.01)

(58) Field of Classification Search
CPC .................................................. G06Q 10/087
(Continued)

(56) References Cited

U.S. PATENT DOCUMENTS 6,176,323 B1   1/2001   Weirich et al.
6,256,587 B1   7/2001   Jericevic et al.
(Continued)

FOREIGN PATENT DOCUMENTS

WO   2008/052811 A1   5/2008
WO   2010/065826 A2   6/2010
WO   2013/082498 A2   6/2013

OTHER PUBLICATIONS

Sardroud, Javad Majrouhi. "Influence of RFID technology on automated management of construction materials and components." Scientia Iranica 19.3 (2012): 381-392.
(Continued)

*Primary Examiner* — Russell S Glass
(74) *Attorney, Agent, or Firm* — Jason Sedano; Baker Botts L.L.P.

(57) ABSTRACT

A method and apparatus for real-time analysis of wellsite inventory activity is described. The method includes logging receipt of inventory items at a wellsite and tracking their use. In certain embodiments, the inventory may be chemical sacks mixed into drilling fluids, and their use may be tracked with an RFID scanner near the threshold of a mixing hopper. The tracking information may be used to update an inventory management database. When an item is used, real-time wellsite data may be analyzed to determine its impact on drilling performance. The efficacy of the item may thereby be determined and stored in a predictive model database. In making future wellsite drilling decisions, the predictive model database may be used to select cost-efficient performance improvement solutions. Additionally, performance information may be used to correct real-time data measured during future uses of the inventory item. Reports may be produced from the collected information, including billing reports, regulatory reports, and end-of-well reports. Information collected from various wells may assist during
(Continued)

planning for future well-sites, including assessing inventory needs, developing a logistical plan, and bidding on projects.

20 Claims, 6 Drawing Sheets

(58) Field of Classification Search
USPC .......................................................... 705/28
See application file for complete search history.

(56) References Cited

U.S. PATENT DOCUMENTS

| | | |
|---|---|---|
| 7,775,276 B2 | 8/2010 | Pelletier et al. |
| 8,180,571 B2 | 5/2012 | Holmes |
| 8,364,421 B2 | 1/2013 | Chen et al. |
| 8,395,508 B2 | 3/2013 | Burnside et al. |
| 8,504,590 B2 | 8/2013 | Coker |
| 2006/0131078 A1 | 6/2006 | Browne |
| 2007/0124220 A1* | 5/2007 | Griggs ................ E21B 17/006 705/28 |
| 2008/0316049 A1 | 12/2008 | Verret et al. |
| 2009/0055293 A1 | 2/2009 | Mueller |
| 2009/0087912 A1 | 4/2009 | Ramos et al. |
| 2010/0063901 A1 | 3/2010 | Brierley et al. |
| 2012/0000658 A1 | 1/2012 | Coludrovich, III et al. |
| 2013/0001244 A1 | 1/2013 | Wegelin et al. |
| 2013/0175024 A1 | 7/2013 | Verret et al. |
| 2013/0278433 A1 | 10/2013 | Baxter |
| 2013/0292178 A1* | 11/2013 | Burress ................ E21B 44/00 175/50 |

OTHER PUBLICATIONS

International Search Report and Written Opinion issued in related PCT Application No. PCT/US2014/027429 dated Dec. 8, 2014, 14 pages.

International Preliminary Report on Patentability issued in related Application No. PCT/US2014/027429, dated Sep. 22, 2016 (11 pages).

Office Action issued in related Canadian application No. 2,933,468, dated Feb. 2, 2018 (4 pages).

* cited by examiner

REAL-TIME ANALYSIS OF WELLSITE INVENTORY ACTIVITY

CROSS-REFERENCE TO RELATED APPLICATION

The present application is a U.S. National Stage Application of International Application No. PCT/US2014/027429 filed Mar. 14, 2014, which is incorporated herein by reference in its entirety for all purposes.

BACKGROUND

The present disclosure relates generally to well drilling operations and, more particularly, to the real-time analysis of wellsite inventory activity.

The use of consumables to assist in oil rig activities is well known in the subterranean well drilling and completion art. For example, mud engineers may pump in materials from mixing chemical sacks to facilitate particular drilling activities. The effect of the chemical sack may be observed in data generated during drilling activities from, for example, wellsite sensors, measurement-while-drilling/logging-while-drilling tools, and software application logs.

Analysis of the various data is well known in the art. However, such data often does not include information about the timing and use of consumables or, if it is included, must be provided manually after-the-fact. The limitations of current data analysis thus make it difficult or time consuming to analyze the efficacy of consumables. Additionally, accurately determining and tracking consumable inventory availability, use, and projected need is challenging. More accurate data would be useful for wellsite supply-chain management, customer billing, and regulatory compliance.

FIGURES

Some specific exemplary embodiments of the disclosure may be understood by referring, in part, to the following description and the accompanying drawings.

Figure 1:
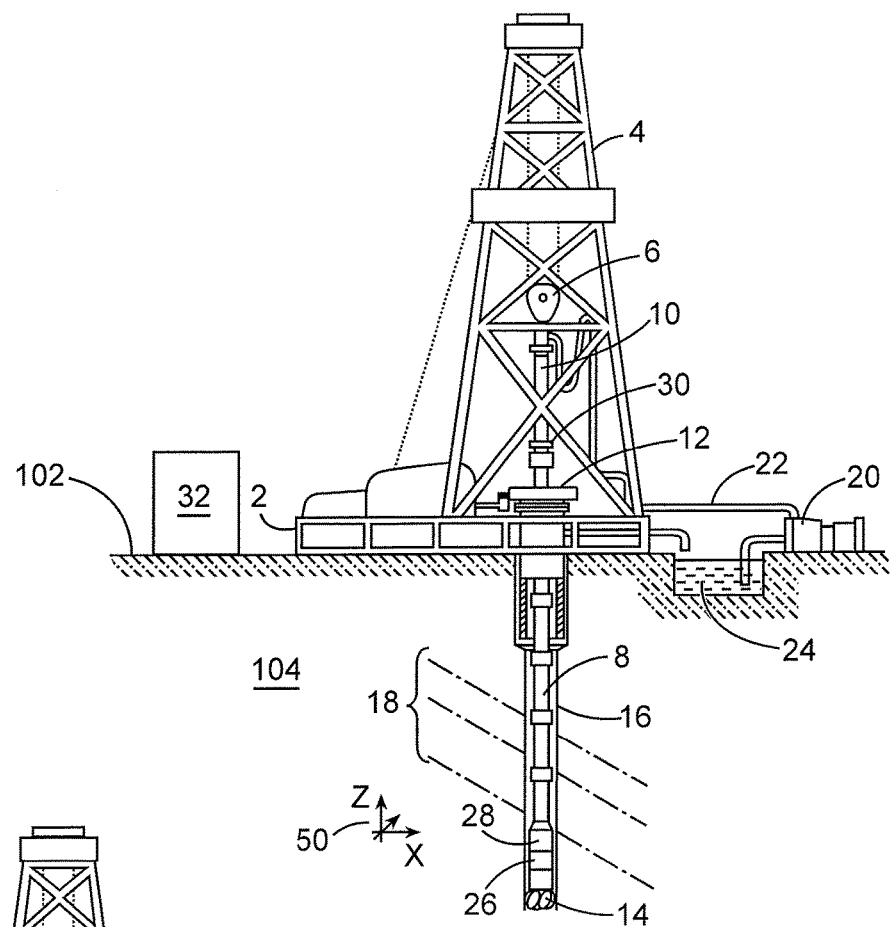
FIG. 1 is a diagram showing an illustrative logging while drilling environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to the real-time analysis of wellsite inventory activity.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. The information handling system may further include a microcontroller, which may be a small computer on a single integrated circuit containing a processor core, memory, and programmable input/output peripherals. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near-surface construction purposes or borehole u-tube pipelines used for the transportation of fluids such as hydrocarbons. Embodiments described below with respect to one implementation are not intended to be limiting.

FIG. 1 is a diagram of a subterranean drilling system 100, according to aspects of the present disclosure. The drilling system 100 comprises a drilling platform 2 positioned at the surface 102. In the embodiment shown, the surface 102 comprises the top of a formation containing one or more rock strata or layers 18, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 100 may comprise a bottom hole assembly (BHA) coupled to the drill string 8 near the drill bit 14. The BHA may comprise a LWD/MWD tool 26 and a telemetry element 28. In certain embodiments, the LWD/MWD tool 26 may be integrated at any point along the drill string 8. The LWD/MWD tool 26 may include receivers and/or transmitters (e.g., wired pipe, antennas capable of receiving and/or transmitting one or more electromagnetic signals). In some embodiments, the LWD/MWD tool 26 may include a transceiver array that functions as both a transmitter and a receiver. As the bit extends the borehole 16 through the formations 18, the LWD/MWD tool 26 may collect measurements relating to various formation properties as well as the tool orientation and position and various other drilling conditions. The orientation measurements may be performed using an azimuthal orientation indicator, which may include magnetometers, inclinometers, hall effect sensors, and/or accelerometers, though other sensor types such as gyroscopes may be used in some embodiments. In embodiments including an azimuthal orientation indicator, resistivity and/or dielectric constant measurements may be associated with a particular azimuthal orientation (e.g., by azimuthal binning). The telemetry sub 28 may transfer measurements from the LWD/MWD tool 26 to a surface receiver 30 and/or to receive commands from the surface receiver 30. Measurements taken at the LWD/MWD tool 26 may also be stored within the tool 26 for later retrieval when the LWD/MWD tool 26 is removed from the borehole 16.

In certain embodiments, the drilling system 100 may comprise an information handling system 32 positioned at the surface 102. The information handling system 32 may be communicably coupled to the surface receiver 30 and may receive measurements from the LWD/MWD tool 26 and/or transmit commands to the LWD/MWD tool 26 though the surface receiver 30. The information handling system 32 may also receive measurements from the LWD/MWD tool 26 when it is retrieved at the surface 102. In certain embodiments, the information handling system 32 may process the measurements to determine certain characteristics of the formation 104 (e.g., resistivity, permeability, conductivity, porosity, etc.) In some cases, the measurements and formation characteristics may be plotted, charted, or otherwise visualized at the information handling system 32 to allow drilling operators to alter the operation of the drilling system 100 to account for downhole conditions.

Figure 2:
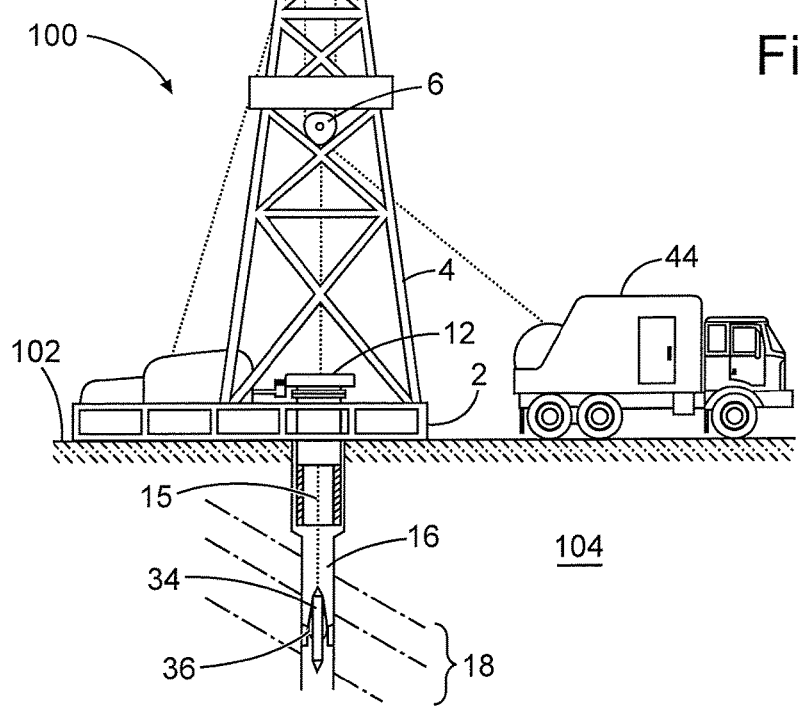
FIG. 2 is a diagram showing an illustrative wireline logging environment, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may include one or more logging/measurement tools 36 having transmitters, receivers, and/or transceivers similar to those described above in relation to the LWD/MWD tool 26. The logging/measurement tool 36 may be communicatively coupled to the cable 15. A logging facility 44 (shown in FIG. 1 as a truck, although it may be any other structure) may collect measurements from the logging tool 36, and may include computing facilities (including, e.g., an information handling system) for controlling, processing, storing, and/or visualizing the measurements gathered by the logging tool 36. The computing facilities may be communicatively coupled to the logging/measurement tool 36 by way of the cable 15. In certain embodiments, the information handling system 32 may serve as the computing facilities of the logging facility 44.

Figure 3:
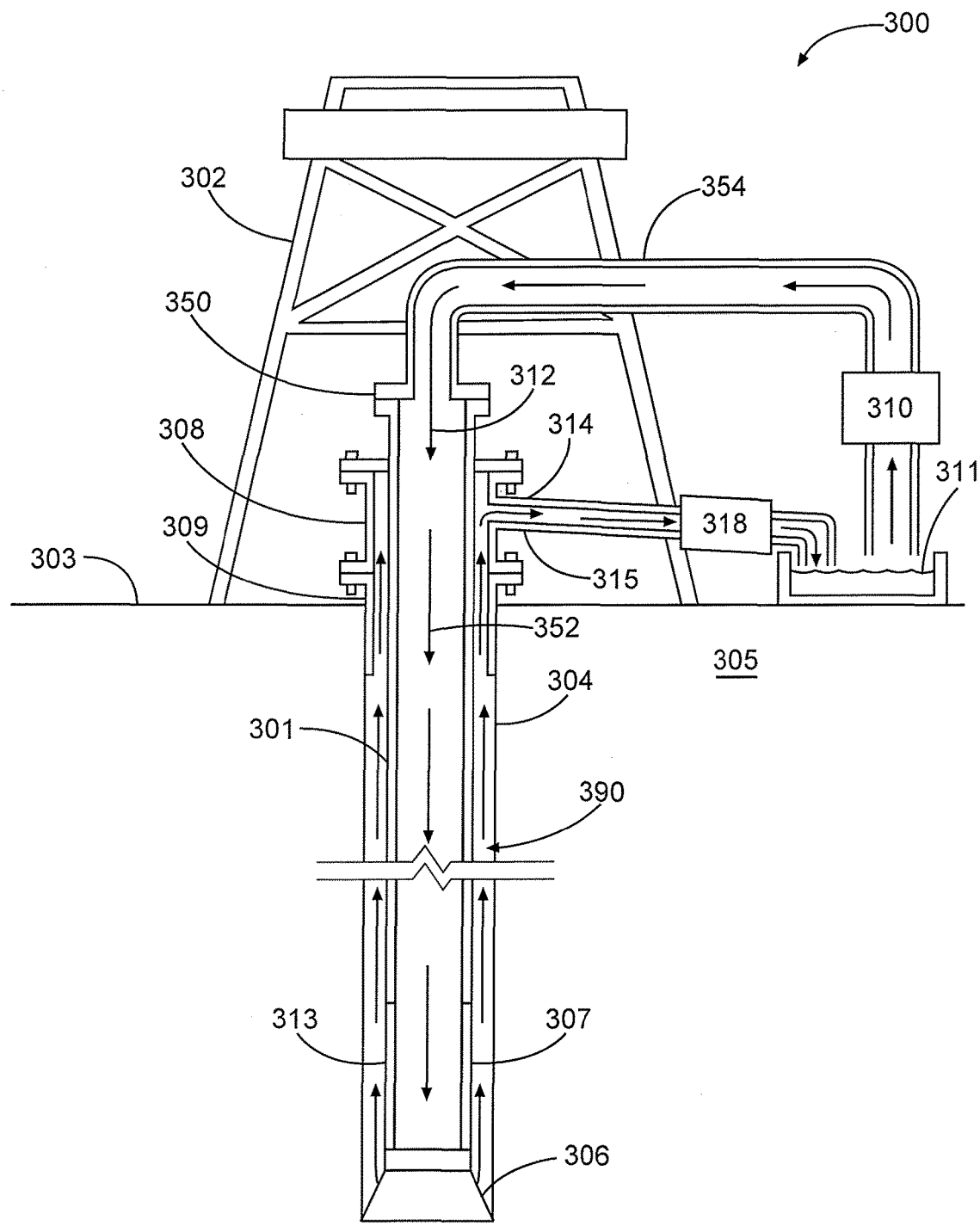
FIG. 3 is a diagram showing an illustrative drilling fluid system, according to aspects of the present disclosure.

FIG. 3 is a diagram showing an illustrative drilling fluid system 300, according to aspects of the present disclosure. The drilling fluid system 300 comprises a drilling assembly 390 that is suspended from a drilling rig 302 at the surface 303 and disposed in a borehole 304 within a formation 305. The drilling assembly 390 may comprise a tubular drill string 301 and a drill bit 306 may be coupled to a distal end of the drill string 301. The drill bit 390 may be rotated either by a top drive or kelley mechanism 350 at the surface 303 that rotates the entire drilling assembly 390. In the embodiment shown, the drilling assembly 390 further comprises a bottom-hole assembly (BHA) 307 through which the drill bit 304 is indirectly coupled to the drill string 301. The BHA 307 may include a variety of MWD/LWD tools, drill collars, steering systems, downhole motors, etc., depending on the drilling application.

The drill string 301 extends downwardly through a surface tubular 308 into the borehole 304. The surface tubular 308 may be coupled to a wellhead 309. The wellhead 309 may include a portion that extends into the borehole 304. In certain embodiments, the wellhead 309 may be secured within the borehole 304 using cement, and may work with the surface tubular 308 and other surface equipment, such as a blowout preventer (BOP) (not shown), to prevent excess pressures from the formation 305 and borehole 304 from being released at the surface 303.

During drilling operations, a pump 310 located at the surface 303 may pump drilling fluid from a fluid reservoir 311 through the top drive 350, into the inner bore 352 of the drill string 301. The pump 310 may be in fluid communication with the inner bore 352 through at least one fluid conduit or pipe 354 coupled between the pump 310 and the top drive 350. As indicated by arrows 312, the drilling fluid may flow through the interior bore 352 of drill string 301, through the drill bit 306 and into a borehole annulus 313. The borehole annulus 313 is created by the rotation of the drill string 301 and attached drill bit 306 in borehole 304 and is defined as the space between the interior/inner wall or diameter of borehole 304 and the exterior/outer surface or diameter of the drill string 301. The annular space may extend out of the borehole 304, through the wellhead 309 and into the surface tubular 308.

Fluid pumped into the borehole annulus 313 through the drill string 301 flows upwardly through the borehole annulus 313. Surface tubular 308 is in fluid communication with the borehole annulus 313 and the drilling fluid may exit the borehole annulus 313 into the annular space of the surface tubular 308. The surface tubular 308 may have an outlet port 314 coupled to a fluid conduit or pipe 315. The fluid conduit 315 may also be referred to as a fluid return, where drilling fluid pumped downhole through the drill string 301 returns to the surface 303. Specifically, drilling fluid flowing through the borehole annulus 313 may enter the surface tubular 308 and exit through the outlet 314 to the fluid conduit 315. The fluid conduit 315 may provide fluid communication between the borehole annulus 313 and at least one fluid treatment mechanism 318, which may include screens that filter out particulates from the fluid before passing the fluid to the surface reservoir 311.

Drilling fluid may be pumped into the borehole 304 to maintain well control (e.g., to prevent the unplanned influx of fluids from formation 305). Drilling fluid may also provide a number of other benefits, including but not limited to: cleaning the face of drill bit 306, circulating cuttings out of the borehole 304, cooling the drill bit 306, controlling corrosion of drilling assembly 390, maintaining the mechanical and/or chemical stability of borehole 304, manage friction in borehole 304. To achieve those objectives, various materials (sometimes called chemical sacks) may be added to a base drilling fluid (commonly fresh water, brine, oil, diesel, or a synthetic base fluid). Some examples of additives and their desired function are shown in the table below:

| Additive | Function |
|---|---|
| Barite | Weighting agent |
| Salt (e.g., NaCl, CaCO3, or other salts) | Weighting agent, control swelling shales |
| Walnut shell | Reduce friction |
| Glass beads | Reduce friction |
| Halliburton STEELSEAL ® 50 | Reduce fluid loss |
| Halliburton EZ MUL ® NS | Emulsifier |
| Halliburton BAROLIFT ® | Hole sweeping agent |
| Halliburton FORTI-MUL ® | Emulsifier |

Figure 4:
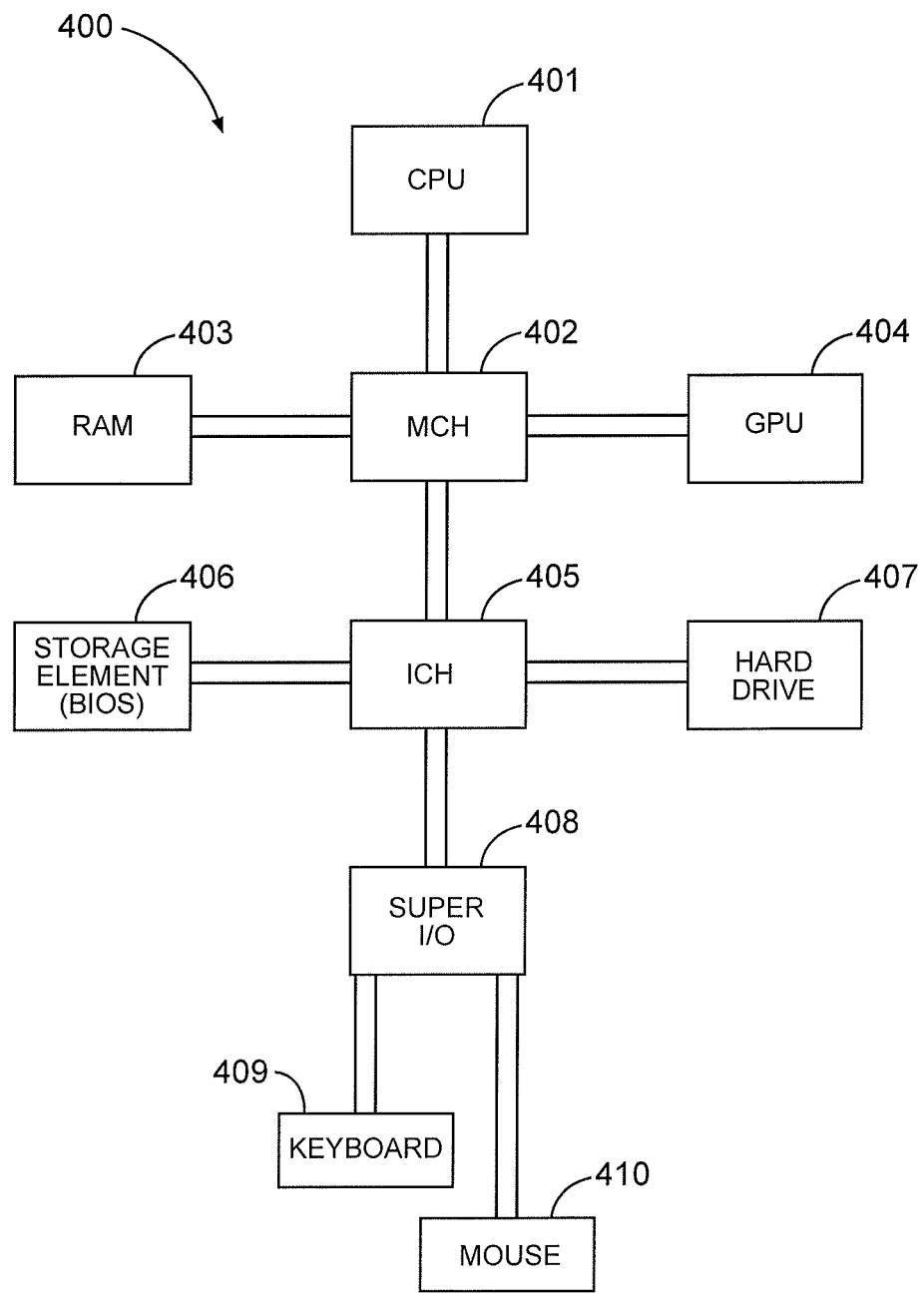
FIG. 4 is a diagram of an example information handling system, according to aspects of the present disclosure.

FIG. 4 is a block diagram showing an example information handling system 400, according to aspects of the present disclosure. Information handling system 400 may be used with the drilling system described above and with other subterranean drilling systems. In certain embodiments, some or all of the steps shown in FIGS. 5-7 and discussed below may be performed by one or more information handling systems 400. Moreover, the inventory management database, predictive model database, and/or logistical model database discussed below may be embodied in one or more information handling systems 400.

The information handling system 400 may comprise a processor or CPU 401 that is communicatively coupled to a memory controller hub or north bridge 402. Memory controller hub 402 may include a memory controller for directing information to or from various system memory components within the information handling system, such as RAM 403, storage element 406, and hard drive 407. The memory controller hub 402 may be coupled to RAM 403 and a graphics processing unit 404. Memory controller hub 402 may also be coupled to an I/O controller hub or south bridge 405. I/O hub 405 is coupled to storage elements of the computer system, including a storage element 406, which may comprise a flash ROM that includes a basic input/output system (BIOS) of the computer system. I/O hub 405 is also coupled to the hard drive 407 of the computer system. I/O hub 405 may also be coupled to a Super I/O chip 408, which is itself coupled to several of the I/O ports of the computer system, including keyboard 409 and mouse 410. The information handling system 400 further may be communicably coupled to one or more elements of a drilling system though the chip 308 as well as a visualization mechanism, such as a computer monitor or display.

The information handling systems described above may include software components that process and characterize data and software components that generate visualizations from the processed data. As used herein, software or software components may comprise a set of instructions stored within a computer readable medium that, when executed by a processor coupled to the computer readable medium, cause the processor to perform certain actions. In the case of a data characterization/processing component, the set of instructions may cause the processor to receive "raw" data from a data source (e.g., measurements from a LWD/MWD tool), and to process the "raw" using various algorithms or other processing techniques that would be appreciated by one of ordinary skill in the art in view of this disclosure and the purposes to be achieved by the data processing. In the case of a software component that generates visualizations, the set of instructions may cause the processor to receive processed data from a data characterization/processing component and generate a visualization (e.g, chart, graph, plot, 3-D environment, etc.) based on that data.

Figure 5:
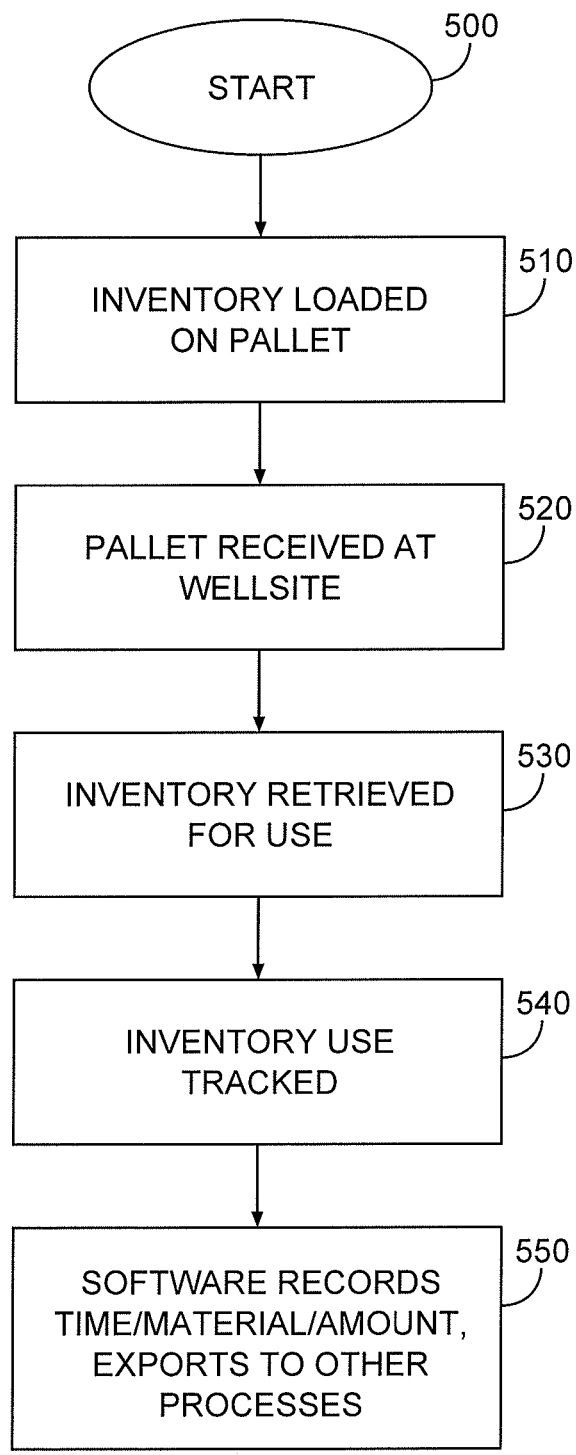
FIG. 5 is a flowchart showing an overview of steps for inventory analysis, according to aspects of the present disclosure.

FIG. 5 is a flowchart showing an overview of steps for inventory analysis according to aspects of the present disclosure. At start 400, one or more oil rig sites (such as the embodiments shown in FIGS. 1-3) may be carrying out various operations in the oilfield exploration and production process. For example, a wellsite may be engaged in drilling operations, production operations, and/or logging/measurement operations.

At step 510, inventory for wellsite may be loaded onto a pallet for delivery to the wellsite. The inventory may include consumables, for example, mixing chemical sacks. In certain embodiments, each of the consumables (such as an individual chemical sack) may include an electronic tag, for example a passive RFID tag, containing information about the consumable (e.g., type of product, quantity of product, source of product, cost of product). The tag may have been affixed to the product by its manufacturer or may be added at a later time. The pallet may also be equipped with an electronic tag and/or tracking system. In certain embodiments, the pallet may be equipped with, for example, a passive RFID tag that includes information about the pallet and its contents. In alternative embodiments, the pallet may be equipped with an active RFID tag and/or an RFID reader. In such embodiments, the pallet may be configured to read the tag information of the consumables and, optionally, transmit aggregated information to an inventory management database.

At step 520, the pallet may be received at the wellsite and unloaded onto a rig pad. During unloading, the electronic tags on the inventory and/or pallet may be read using a variety of different techniques. For example, if the inventory is manually received by employees, an electronic ID scanner may be provided at a threshold near the receiving area. The threshold may be, for example, a PVC pipe with an embedded tag reader so that tags are read when the pallet or inventory is transported over the threshold. In alternative embodiments, incoming inventory may be processed by an automated system that may automatically unload inventory and scan the tags. Further, in embodiments where an active RFID is used on the pallet, aggregated information may be broadcast from the pallet, obviating the need for scanning individual tags. Regardless of how obtained, the information received concerning the type, quantity, etc. of incoming inventory may be used to update an inventory management database in real-time such that a wellsite operator may be able to determine accurate on-site inventory information. The tagging or inventory management database may optionally include information about the location of inventory items to facilitate later retrieval.

At step 530, an inventory item may be needed for use in wellsite operations. For example, if a drilling operator desires a decrease in torque, a sack of glass beads may be mixed into the drilling fluid. At the time the inventory item is retrieved for use, the electronic tag may be scanned to track the type and quantity of item removed from on-site inventory. In situations where an employee manually retrieves the item, a scanning threshold may be provided at the point of use (e.g., in the case of a chemical sack, near the mixing hopper); the scanning threshold may be, for example, the PVC pipe embodiment described with respect to step 520. In alternative embodiments where inventory is handled by an automation system, that system may include sensors for reading the tags. Regardless of how obtained, the information retrieved from the tag may be used to update an inventory management database in real-time—for example, to indicate that the identified item has been removed from on-site inventory.

At step 540, the use of the inventory may be tracked by automated means. For example, if the item is a sack mixture that has been poured into a hopper, various electronic metering measurements may be performed (weight, flow rate, etc.) to control and track the usage of the product. In this way, the usage of the product may be controlled by the wellsite operator. For example, the wellsite operator may specify a timing and flow rate of a particular additive to control its release into the drilling fluid flow. Further, real-time data tracking product use may be stored (e.g., data identifying when and how much sack mix is added to the mud). As discussed below, such real-time data may be used, for example, to evaluate the efficacy of the product by comparing real-time data about the product's use to real-time data indicating its effect on drilling operations.

At step 550, the information stored in the inventory management database may be exported to other software packages, such as Halliburton's DFG™ or WELLPLAN™ or Schlumberger's Petrel®. Similarly, information may be formatted into a network-distribution standard such as the Wellsite Information Transfer Standard Markup Language (WITSML) format. In this way, information concerning inventory management and real-time inventory use data may be aggregated with other wellsite data.

Although the steps of FIG. 5 are shown as discrete steps in a linear order, it may be understood in light of the present disclosure that the steps may overlap or be performed in a different order than the one shown. For example, one set of inventory may be arriving and added to the inventory management database (step 520) while other inventory items are being used (step 530).

Figure 6:
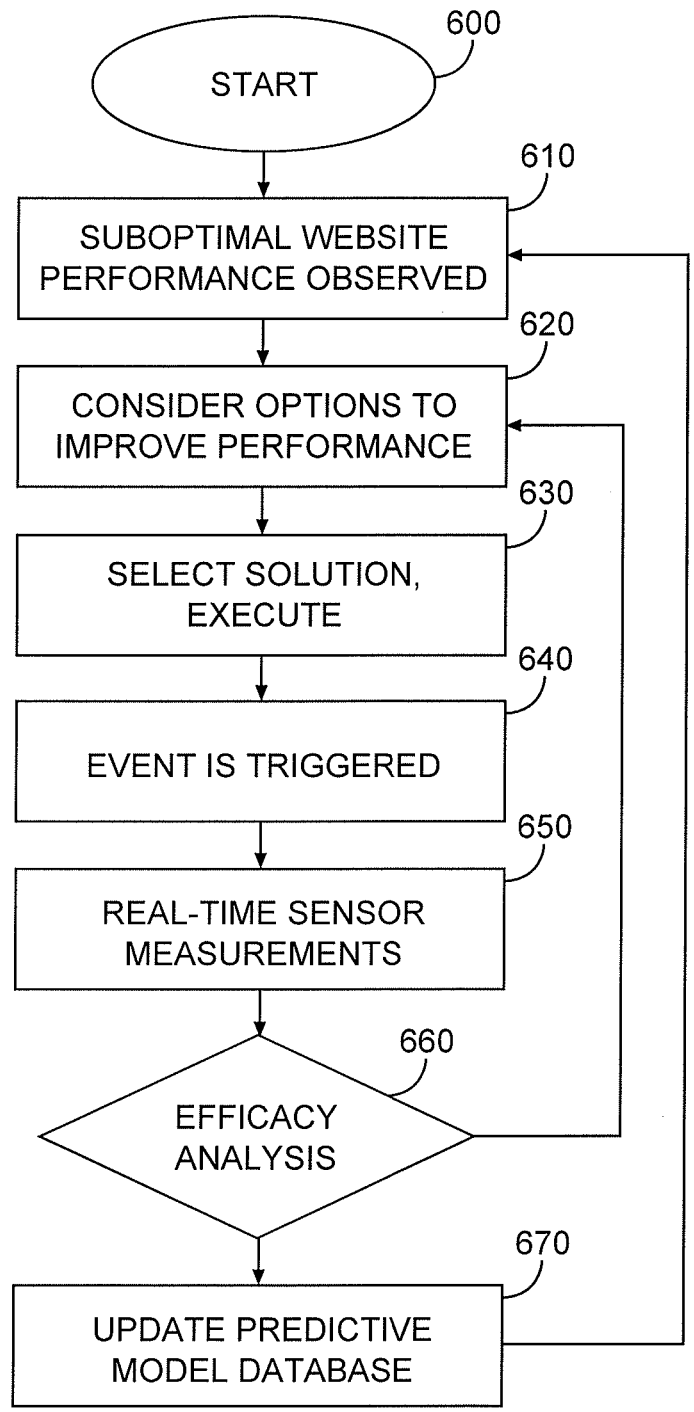
FIG. 6 is a flowchart showing an overview of steps for drilling optimization according to aspects of the present disclosure.

FIG. 6 is a flowchart showing an overview of steps for drilling optimization according to aspects of the present disclosure. At start 600, one or more oil rig sites (such as the embodiments shown in FIGS. 1-3) may be carrying out various operations in the oilfield exploration and production process. For example, a wellsite may be engaged in drilling operations, production operations, and/or logging/measurement operations.

At step 610, suboptimal wellsite performance may be observed. For example, a drilling engineer may determine that drilling progress is slower than expected or desired.

At step 620, a wellsite engineer may consider options for improving performance, including the optional use of consumable inventory. For example, a mud engineer may consider whether adding a chemical sack or mixture of chemical sacks to the drilling mud would improve drilling performance. In certain embodiments, an engineer may consult a predictive model database listing potential options and their efficacy—for example, a listing of chemical sack mixtures and their anticipated effect on drilling fluid and drilling performance.

At step 630, a wellsite engineer may select a solution from among the available options and execute it. Executing the solution may include manually performing steps (or instructing an employee to perform steps) such as retrieving and using a consumable. In alternative embodiments, the predictive model database consulted in step 620 may control the operation of an automation system to perform the selected actions. For example, an automation system may be configured to automatically retrieve and mix a selected chemical sack "prescription" and add it to drilling fluid.

At step 640, the use of any consumables may be tracked in real-time, for example as described in steps 530 and 540 above, and aggregated as a single event record. Thus, if the solution selected in step 630 involves the retrieval and use of multiple consumables, data concerning the retrieval and use of each of the consumables may be grouped together. For example, if the selected solution requires retrieving and adding several different chemical sacks to the drilling mud, information about the type of sacks selected, the time that each sack is added, the amount of each sack added, etc. may be recorded and aggregated together in a single event record.

At step 650, relevant wellsite sensor measurements (from wellsite sensors, LWD/MWD instruments, etc.) may also be added to the event record. In this way, the effect of the consumable on wellsite operations may be measured. For example, if the observed suboptimal performance in step 610 was an undesirably low rate of penetration during drilling, real-time measurements related to the rate of penetration may be aggregated to determine the effect of the solution selected in step 630 on drilling penetration rates and other wellsite measurements. In this way, the impact of the selected solution may be quantified and evaluated.

In certain embodiments, the triggering of the event in step 640 may also be used to enhance real-time data interpretation. If wellsite engineers understand which consumables were deployed and at what time, control system methodologies may be used to anticipate expected changes in real-time data and better interpret the results. For example, if a chemical sack "pill" is mixed into the drilling fluid, wellsite engineers may anticipate the impact of the pill on real-time measurements (e.g., drilling fluid density) by receiving automatically tracked information about which materials were added, what quantity was added of each, and when they were added. Further, by combining that information with other real-time data such as drilling speed, annulus size, etc., wellsite engineers may perform space/time calculations to track the progress of the pill through the drilling system. In this way, real-time data that may otherwise appear as anomalous may instead be understood as an anticipated result of the pill travelling through the system. Further, if the pill has a narrow window of effect in the downhole application—for example, if the pill is most effective while in the bottom-hole region—the space/time calculations may be used to track the pill so that a wellsite operator may take appropriate action based on the pill's location. Detailed information about the consumable's effect may be included in the predictive model database and may be used to assist this analysis.

Additionally or alternatively, the expected impact of the pill may be "backed out" of the observed data to determine what the real-time data likely would have shown if the pill had not been added. Such dynamic analysis may be assisted by non-linear process map models, such as may be implemented in Stateflow® by MathWorks, that provide state diagrams to track drilling operations with event triggers corresponding to the solution selected in step 630. This may be particularly useful where the deployment of a consumable has the undesirable side effect of obscuring or hindering other real-time data collection.

Such correction of LWD/MWD data may occur in real-time so that wellsite operators have updated information for real-time monitoring of wellsite conditions. Real-time corrections may be particularly desirable where the pill is pumped with a high rate of penetration relative to the pill space-time, making accurate measurements difficult. Additionally or alternatively, such correction may be applied to recorded LWD/MWD data. A corrected data log record may aid, for example, in later fracking decisions.

At step 660, an efficacy analysis may be performed to generate a report regarding the performance of the solution executed in step 630. The analysis may assist in the evaluation of the drilling decision made in step 620 and/or in the evaluation of potential future drilling decisions. The analysis may consider all of the information tracked in relation to the event, including information such as the cost of consumables, the observed effect on real-time data (both improvements and deteriorations in performance), a comparison to the status quo, the opportunity cost of other solutions not pursued, etc. Based on the efficacy analysis, a decision may be made as to whether the solution was net cost-beneficial and whether any further remedial steps are desirable. If additional steps are desired, the process may repeat at step 630 with the wellsite operator selecting whether to execute the same solution again or to pursue some alternative solution.

At step 670, the efficacy analysis generated in step 660 may be used to update the predictive model database. The update may include both high-level efficacy information as well as more detailed calculations describing the transfer function associated with the solution (e.g., rise time, peak time, percent overshoot, settling time, damping ratio response type and character). Thus, even if a particular solution was determined to be effective or not effective in a certain wellsite configuration, the additional data may assist in predicting how that same solution would perform in a different wellsite configuration.

The logistical database may also be useful for the design of experiments. End users at individual wells or wells with similar operating parameters (e.g., wells in the same geographical area) may design experiments to compare uses of inventory. For example, different chemical sack mixes may be used in multiple tests run in similar environments to compare their efficacy and collect data for refining drilling fluid models. As another example, the same chemical sack may be used but in different quantities in each experiment. The results of the experiments may be logged in the logistical database so that the database may have robust information to enable operators to compare drilling decision alternatives, such as at step 620.

Figure 7:
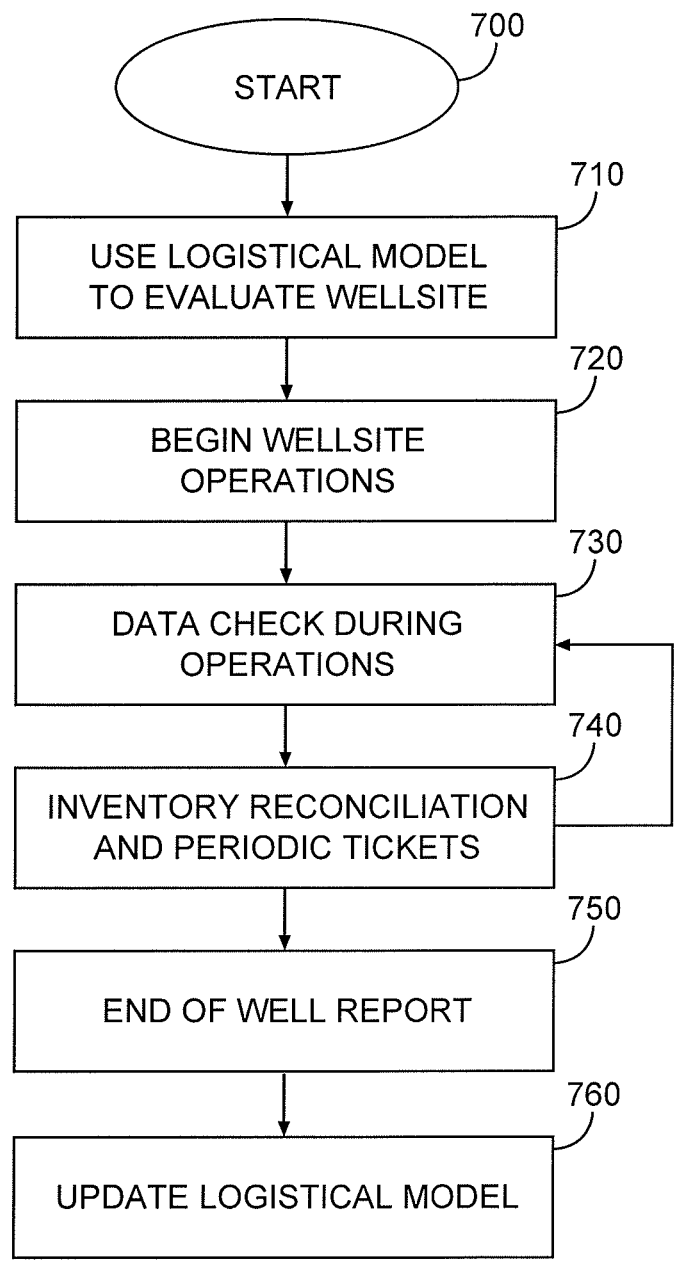
FIG. 7 is a flowchart showing an overview of steps for wellsite planning and operation according to aspects of the present disclosure.

FIG. 7 is a flowchart showing an overview of steps for wellsite planning and operation according to aspects of the present disclosure. At start 700, one or more oil rig sites (such as the embodiments shown in FIGS. 1-3) may be under consideration for exploration and/or production operations. A wellsite administrator may be evaluating the desirability of the well or preparing a logistical plan for well operations.

At step 710, the administrator may use a logistical model database to determine inventory needs for the wellsite under consideration. In certain embodiments, the logistical model may contain historical inventory data indexed by basin or area so that the engineer can look up nearby wellsites and review inventory data, such as what inventory was needed, how much was needed, and when it was needed. Additionally or alternatively, the logistical model may be indexed by wellsite properties (e.g., lithology, depth) so that the engineer may use known properties of the planned wellsite to review historical information from similar wellsites with comparable properties. The logistical model at step 710 may include efficacy information from the predictive model database, discussed above with respect to steps 630 and 670. In this way, the engineer may identify not only which inventory was used but also anticipate which inventory items may be particularly well-suited to the anticipated wellsite environment.

Based on this analysis, the administrator may estimate which inventory items the wellsite will need and when they will be needed. The administrator may prepare a budget for spending on inventory, which may be used to evaluate the desirability of the wellsite or adjust bids related to the wellsite. If a decision to move forward with operations is made, the administrator may also develop a logistical plan for which inventory items should be ordered and when to schedule their delivery to the wellsite.

At step 720, wellsite operations may begin. The logistical plan developed in step 710 may be presented and revised, for example at a pre-spud meeting, and executed once agreed upon. This may include placing orders for the inventory items needed and scheduling their deliveries. In certain embodiments, a "just-in-time" delivery schedule may be used so that inventory items are delivered shortly before they are anticipated to be needed. In this way, stockpiling of inventory may be avoided and the available rig pad may be used efficiently. Inventory management may be accomplished using tracking systems such as the embodiment of FIG. 5.

At step 730, real-time data may be analyzed to assess well operation progress. This may include tracking the use of inventory (e.g., using the embodiments described above in steps 530 through 550), reviewing real-time wellsite measurement data, and aggregating reports on the efficacy of consumables (e.g., using the embodiments described above in steps 630 through 660). Based on this analysis, a wellsite operator may make adjustments to the logistical plan for inventory items. For example, if certain inventory items are being used at a faster or slower rate than anticipated, the wellsite operator may accordingly increase or decrease future orders. Similarly, wellsite measurement data may reveal different operating conditions than originally anticipated, resulting in a revision to the expected types or amounts of inventory items needed for wellsite operations. Further, monitoring updated efficacy information may suggest alternative inventory items that may be better suited to known wellsite conditions. In this way, the logistical plan initially developed at step 710 may be updated and revised during wellsite operations to ensure timely delivery of inventory and efficient use of available rig pad space.

At step 740, tickets may be produced and inventory may be reconciled on a periodic (e.g., daily) basis. Such periodic tickets typically may report on wellsite operations and may identify inventory items used during a reporting period. The tickets may be used for billing customers, regulatory compliance, etc. Using the real-time data collection of the present invention (as in step 730, for example), such tickets (or portions of such tickets) may be automatically generated from the collected data. Additionally or alternatively, discrepancies between real-time information and manually collected information may be reconciled. For example, by tracking inventory inflows and outflows (e.g., as described in the embodiment of FIG. 5), a wellsite administrator should have accurate knowledge of current on-site inventory. In the event an audit, such as a manual on-site count, reveals a discrepancy between actual inventory amounts and the amounts reported by the inventory management database, the inventory management database may be updated (or the audit may be repeated) to reconcile the differences. Similarly, any manually-generated reports, such as from wellsite engineers, may be checked against the real-time collected data.

The process of step 730 and step 740 may be repeated while wellsite operations continue. At step 750, the well may have completed operations and an end-of-well report may be generated. The end-of-well report may document well operations, consumables used, excess inventory remaining, etc. The periodic tickets produced in step 740 may be used to compile the end-of-well report. As with those periodic tickets, the end-of-well report may be reviewed and quality-checked against the real-time data records collected according to the present disclosure.

At step 760, the logistical model database may be updated to reflect information gathered during the well life, including information documented in the end-of-well report generated in step 750. For example, information about the consumables used at the wellsite may be added to the database and indexed by the well's location and/or relevant wellsite parameters. In this way, such information may be available to improve future wellsite planning, as in step 710.

Real-time analysis of inventory activity according to the present disclosure, as illustrated in the embodiments discussed above, may provide numerous benefits in wellsite planning and operations. Automated tracking of inventory arrival and use may enable a more accurate inventory management database. This may assist in logistical planning by keeping updated records about what inventory is available at the wellsite and which products may need to be ordered for future delivery. Efficiency may be increased, and inventory stockpiling reduced, by using the improved logistical planning to implement a just-in-time inventory ordering system where inventory may be scheduled for delivery to the wellsite shortly before the anticipated need.

Accurate records concerning inventory item use may aid in properly billing customers for the cost of those items. Further, accurate records may enable the generation of a regulatory report (e.g., an environmental impact analysis from inventory use). Regulatory compliance may require reports detailing which consumables were delivered to a wellsite and how they were used. For example, regulatory rules may require a zero-discharge analysis documenting the use and recovery of every chemical shipped to a wellsite in order to verify that no chemicals were discharged into the surrounding environment. Automated tracking may ensure that all consumables are correctly accounted for in a regulatory report and assist in the production of such a report. Inventory losses (and associated costs) may also be minimized.

Control systems-type analysis of wellsite measurements before and after a consumable has been used may assist in determining the efficacy of that consumable. As discussed above with respect to the embodiment of FIG. 6, cost-benefit evaluations may be performed and the transfer functions associated with particular consumables may be calculated. In this way, the value of the consumable may be determined and its effects in various wellsite conditions more accurately predicted. Such information may be aggregated in a predictive model database used to assist in future decision-making regarding consumable use.

As discussed with respect to the embodiment of FIG. 7, historical wellsite inventory use information may be aggregated in a logistical model database. This information may be used for wellsite planning, including better informed pre-job planning for inventory needs and delivery timing. The improved pre-job plan may also allow for more accurate job bidding. Further, greater job profitability may be achieved due to the efficiencies gained from supply chain management, improved logistics planning, and inventory loss prevention.

An embodiment is a method comprising logging receipt of an inventory item at a wellsite by reading a tracking tag, tracking use of the inventory item at the wellsite by reading the tracking tag, collecting wellsite data from a plurality of sources during the use of the inventory item, and producing a report based on the wellsite data.

The method may optionally comprise determining a change in the wellsite data caused by the use of the inventory item. In certain embodiments, the method may further comprise correcting the wellsite data based on the change. The correcting may occur in real-time.

The report may optionally comprise an efficacy analysis of the inventory item. In certain embodiments, the efficacy analysis may be used to evaluate a drilling decision.

The method may optionally comprise producing a periodic ticket based on a plurality of the reports. The periodic ticket may comprise a bill for the inventory item. In certain embodiments, the method may comprise producing an end-of-well report based on a plurality of the periodic tickets.

The method may also comprise generating a regulatory report.

An embodiment is an information handling system comprising a memory device communicably coupled to a processor, the memory device containing a set of instruction that, when executed by the processor, cause the processor to: log receipt of an inventory item at a wellsite by reading a tracking tag; track use of the inventory item at the wellsite; collect wellsite data from a plurality of sources during the use of the inventory item; and produce a report based on the wellsite data.

The set of instructions may optionally further cause the processor to update an inventory management database in real-time.

The inventory item may be a chemical sack mix. In certain embodiments, the set of instructions that cause the processor to track use of the inventory item may further comprise instructions to read the tracking tag at a threshold proximate to a mixing hopper. The tracking tag may be an RFID tag.

The set of instructions may further cause the processor to update a predictive model database based on the report.

The set of instructions may optionally cause the processor to produce a periodic ticket based on a plurality of the reports. The periodic ticket may comprise a bill for the inventory item. In certain embodiments, the set of instructions may further cause the processor to produce an end-of-well report based on a plurality of the periodic tickets. The set of instructions may also further cause the processor to update a logistical model database based on the end-of-well report.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. Additionally, the terms "couple" or "coupled" or any common variation as used in the detailed description or claims are not intended to be limited to a direct coupling. Rather, two elements may be coupled indirectly and still be considered coupled within the scope of the detailed description and claims.

What is claimed is:

1. A method comprising:
    logging receipt of an inventory item at a wellsite by reading a tracking tag associated with the inventory item;
    tracking use of said inventory item at said wellsite by reading said tracking tag;
    collecting wellsite data from a plurality of sources during said use of said inventory item;
    determining a change in said wellsite data caused by said use of said inventory item in real time;
    correcting said wellsite data based on said change in real time;
    producing an efficacy analysis report on said inventory item based on said wellsite data;
    updating a predictive model database based on said efficacy analysis report; and
    executing a solution based on the predictive model database.

2. The method of claim 1, wherein the predictive model database controls the executing the solution.

3. The method of claim 1, wherein executing the solution comprises retrieving and using a consumable.

4. The method of claims 3, wherein the consumable comprises a plurality of consumables, and wherein data associated with retrieving and using the plurality of consumables is aggregated in a single event record.

5. The method of claim 1, wherein one or more sensor measurements are added to the single event record.

6. The method of claim 5, further comprising evaluating a drilling decision using said efficacy analysis.

7. The method of claim 1, further comprising producing a periodic ticket based on a plurality of said reports.

8. The method of claim 7, wherein said periodic ticket comprises a bill for said inventory item.

9. The method of claim 7, further comprising producing an end-of-well report based on a plurality of said periodic tickets.

10. The method of claims 9, further comprising generating a regulatory report.

11. An information handling system comprising:
    a memory device communicably coupled to a processor, said memory device containing a set of instruction that, when executed by said processor, cause said processor to:
    log receipt of an inventory item at a wellsite by reading a tracking tag associated with the inventory item;
    track use of said inventory item at said wellsite;
    collect wellsite data from a plurality of sources during said use of said inventory item;
    determine a change in said wellsite data caused by said use of said inventory item in real time;
    correcting said wellsite data based on said change in real time;
    produce an efficacy analysis report on said inventory item based on said wellsite data;
    update a predictive model database based on said report;
    execute a solution based on the predictive model database.

12. The system of claim 11, wherein the predictive model database controls the executing the solution.

13. The system of claim 11, wherein said inventory item is a chemical sack mix.

14. The system of claim 12, wherein said set of instructions that cause said processor to track use of said inventory item comprise instructions to read said tracking tag at a threshold proximate to a mixing hopper.

15. The system of claim 11, wherein said tracking tag is an RFID tag.

16. The system of claim 11, wherein executing the solution comprises retrieving and using a consumable.

17. The system of claim 11, wherein said set of instructions further cause said processor to produce a periodic ticket based on a plurality of said reports.

18. The system of claim 17, wherein said periodic ticket comprises a bill for said inventory item.

19. The system of claim 18, wherein said set of instructions further cause said processor to produce an end-of-well report based on a plurality of said periodic tickets.

20. The system of claim 19, wherein said set of instructions further cause said processor to update a logistical model database based on said end-of-well report.

* * * * *